Patented Sept. 26, 1939

2,174,280

UNITED STATES PATENT OFFICE 2,174,280

METHOD OF PRODUCING BUTADIENE

Victor E. Wellman, Silver Lake, Ohio, assignor to The B. F. Goodrich Company, New York, N. Y., a corporation of New York No Drawing. Application August 25, 1938, Serial No. 226,767

2 Claims. (Cl. 260—681)

This invention relates to the production of butadiene and more particularly to an improved method of producing butadiene by the catalytic dehydration of 1,3 butanediol.

It is well known that butadiene may be produced by passing a solution of 1,3 butanediol over a dehydration catalyst heated to an appropriate temperature for effecting the dehydration. The principal products of this dehydration reaction are separated into two main fractions. The first fraction consists largely of butadiene which is recovered by compression or cooling to suitably low temperatures. The second fraction contains the materials which are liquid at ordinary temperatures. This higher boiling fraction comprises the water initially present in the butanediol solution, the water eliminated from the butanediol by the catalytic dehydration, certain unsaturated alcohols and smaller quantities of other materials.

The presence of some water-insoluble constituents causes the higher boiling fraction to separate into two layers, the upper layer being the smaller in volume. In some previous methods for the production of butadiene from butanediol, the upper layer of the high boiling fraction was passed through the dehydration equipment a second time in order to increase the conversion to butadiene. This upper layer, although soluble in butanediol, is insoluble in a water solution of butanediol. Mixing of the upper layer with the usual aqueous solution of butanediol produces an emulsion which is difficult to process by the usual procedure.

It now has been found possible to utilize much more of the higher boiling fraction for recycling than has hitherto been used. Careful fractional distillation of large quantities of the higher boiling fraction disclosed that one of the principal constituents of this fraction, namely, the unsaturated alcohol 1-butenol-4, forms a constant boiling mixture with water. The mixture consists of about 58% butenol by weight and 42% water by weight. Its boiling point is 90° C. to 92° C. The mixture is miscible with butanediol in all proportions. Solutions of butanediol and the water-butenol constant boiling mixture contain about 25% water when the solution contains about 60% of the mixture. Catalytic dehydration of such a solution raises the conversion to butadiene from 70 or 80% to 90 or 95%.

The invention may be more clearly understood by citing the following example: A solution comprising 75% by weight of butanediol 1,3 and 25% by weight of water is prepared and is brought into contact with a complex aluminum phosphate dehydration catalyst at a temperature of about 285° C. and at a space velocity of about 8 lbs. per cu. ft. of catalyst space per hour. The products of the catalytic dehydration process are passed through a water-cooled condenser which serves to separate the high boiling fraction from the low boiling fraction. The low boiling fraction is recovered by conventional methods, such as refrigeration or compression.

The high boiling fraction is then submitted to fractional distillation through an efficient fractionation column. The mixture of 1-butenol-4 and water which distills at 90° to 92° C. is separated from the other products of the distillation, and is added to butanediol in the proportion of 60 parts by weight of the water-butenol mixture to 40 parts by weight of butanediol. This 3-component solution is then subjected to catalytic dehydration. The cycle may then be repeated indefinitely. It should be pointed out that unsaturated alcohol thus recovered does not require rigid purification before reuse; i. e., it does not have to be dried.

Although the invention has been described in considerable detail with respect to certain preferred materials and condition of operation, I do not wish to be limited to the specific examples herein above set forth and it should be understood that wide variations with relation to materials and operations are possible without departing from the spirit and the scope of the invention.

I claim:

1. A process for producing butadiene which comprises catalytically dehydrating butanediol 1,3, separating the dehydration products into a low-boiling fraction consisting principally of butadiene and a high-boiling fraction containing substantially all the remaining products of the dehydration, subjecting the high-boiling fraction to fractional distillation and thereby separating a constant-boiling mixture of water and 1-butenol-4 distilling at 90°-92° C., chiefly at 91° C., at atmospheric pressure, admixing a quantity of said constant-boiling mixture with butanediol 1,3 and subjecting the resulting solution to catalytic dehydration.

2. A process for producing butadiene which comprises catalytically dehydrating a solution comprising butanediol 1,3, separating the dehydration products into a low-boiling fraction consisting principally of butadiene and a high-boiling fraction containing substantially all the remaining products of the dehydration, subjecting the high-boiling fraction to fractional distillation and thereby separating a constant-boiling mixture of water and 1-butenol-4 distilling at 90°-92° C., chiefly at 91° C. at atmospheric pressure, and admixing the said constant-boiling mixture with butanediol 1,3 to make up the original solution to be dehydrated.

VICTOR E. WELLMAN.